United States Patent [19]

Campman

[11] Patent Number: 4,612,814
[45] Date of Patent: Sep. 23, 1986

[54] FLOW METER AND DENSITOMETER APPARATUS

[75] Inventor: Keith S. Campman, Tulsa, Okla.

[73] Assignee: Dowell Schlumberger Incorporated, Tulsa, Okla.

[21] Appl. No.: 508,768

[22] Filed: Jun. 29, 1983

Related U.S. Application Data

[63] Continuation-in-part of Ser. No. 337,352, Jan. 6, 1982, abandoned.

[51] Int. Cl.⁴ .............................................. G01F 1/28
[52] U.S. Cl. .................................................. 73/861.72
[58] Field of Search ................ 73/28, 861.72, 861.04, 73/861.71; 261/69 R, DIG. 7

[56] References Cited

U.S. PATENT DOCUMENTS

| | | | |
|---|---|---|---|
| 1,136,004 | 4/1915 | Gross | 261/DIG. 7 |
| 2,400,416 | 5/1946 | Hersey | 261/69 R X |
| 2,566,012 | 8/1951 | Winkler et al. | 261/69 R X |
| 2,804,771 | 9/1957 | Brown | 73/861.72 |
| 2,826,915 | 3/1958 | Libman et al. | 73/861.72 |
| 3,138,955 | 6/1964 | Uttley | 73/861.72 |
| 3,842,791 | 10/1974 | De Brey | 73/28 X |
| 3,881,354 | 5/1975 | Block | 73/861.71 |
| 4,300,399 | 11/1981 | Kuijpers et al. | 73/861.04 |

Primary Examiner—Richard L. Chiesa
Attorney, Agent, or Firm—V. Dean Clausen; L. Wayne White

[57] ABSTRACT

The instrument disclosed herein is designed for measuring flow rates and densities of moving fluid streams, including liquids, gases, slurries, and fluids which contain solid materials. In one embodiment of this instrument, a conduit section, which has a 90 degree bend therein, is placed in a transfer line which carries the fluid stream to its use point. Defined within the conduit section is a chamber, which is located at the bend in the conduit. Installed within the chamber is a force measuring transducer and a piston, which is in contact with the diaphragm assembly of the transducer. In operation, part of the moving fluid is diverted into the chamber, to equalize fluid pressure across the diaphragm assembly of the transducer and the piston. This removes the effect of fluid pressure on the flow rate and density measurement, and allows the moving fluid to displace the piston by the force exerted by the fluid. The transducer registers the force and transmits it to a computer system, which converts it to a flow rate as a function of the force. A separate transducer measures the velocity of the stream and this measurement is converted to a density value.

7 Claims, 4 Drawing Figures

FLOW METER AND DENSITOMETER APPARATUS

CROSS REFERENCE TO RELATED APPLICATION

This application is a continuation-in-part of U.S. Application Ser. No. 337,352, filed Jan. 6, 1982, and abandoned.

BACKGROUND OF THE INVENTION

The invention relates to an apparatus and method for measuring the flow rate and density of moving fluid streams. More specifically, the apparatus and method is designed to measure the force of a moving fluid stream, and to independently measure the velocity of the stream. From these values, the flow rate and density can be derived.

Many operations in the chemical industry, in the recovery of oil and gas from earth formations, and in other industrial processes, require measuring the flow rate and/or the density of a moving fluid stream. The usual fluid streams are liquids, gases, and slurries, or liquids and gases which contain solid materials. There are several different types of conventional instruments now available for measuring flow rates and densities of fluid streams.

Flow meters are generally classified as the "intrusive" type or "non-instrusive" type. In the operation of intrusive flow meters, certain components of the instrument are placed directly in the moving fluid stream, so that this part of the instrument is subjected to the erosive effect of the stream at all times. Conversely, the non-intrusive flow meters are instruments in which the flow measuring components are not inserted directly into the moving stream, so that the erosive effects of the stream are minimized.

A turbine flow meter is an example of a conventional intrusive-type flow meter. The turbine structure is an axial mounted rotor. The rotor is placed inside the pipeline which carries the fluid stream to be measured, so that the stream must pass directly through the rotor. This causes the rotor to turn and the rotor blades induce an AC current in the coil surrounding a permanent magnet in the pickup. The frequency of the AC signal is directly proportional to the liquid velocity. With proper calibration, the output frequency can be used for direct flow rate indication.

The instrument described above, as well as many other commercially available instruments, have certain drawbacks which make them impractical for measuring flow rates of moving fluids in many commercial operations. For example, in some oil well servicing operations, viscous liquids or slurry compositions are injected into the wellbore under high pressure and high velocity. The use of turbine flow meters in these operations has been generally unsatisfactory. For example, the rotor bearings often fail; but a more serious problem is that the space between the rotor and the housing becomes clogged. When this happens, the entire rotor structure can either break loose from the housing, and be carried into the wellbore by the moving fluid, or it becomes seized in the housing and the moving slurry "wormholes" the housing wall until a serious failure occurs.

The apparatus of this invention has a distinct advantage over the prior devices. For example, none of the parts of this instrument are inserted into the moving fluid stream which is being measured for flow rate, so that this instrument is a non-intrusive flow meter. In addition, the present apparatus is also capable of measuring the density of moving fluid streams, so that it can function both as a flow meter and a densitometer.

SUMMARY OF THE INVENTION

The apparatus of this invention is designed for measuring the flow rate and density of moving fluid streams, such as liquids, gases, and liquids or gases which have solid materials suspended in the stream. Basically, the apparatus consists of a first conduit section for carrying the fluid stream which is to be measured for flow rate and density. A chamber is defined within the conduit section and a fluid contact means is positioned in the chamber, such that it can contact the fluid stream as it flows through the first conduit section. Also positioned in the chamber is a force measuring means, which is in contact with the fluid contact means.

A compartment is defined in the chamber between the fluid contact means and the force measuring means. A second conduit section communicates with a first conduit section and the compartment in the chamber. In the operation of this apparatus, part of the fluid stream which is moving through the first conduit section, is diverted through the second conduit section and into the compartment in the chamber. This brings the fluid pressure in the first conduit section into equilibrium with the fluid pressure in the chamber compartment, and thus removes the effect of the fluid pressure on the flow rate measurement.

With the effect of fluid pressure removed from the system, the force of the fluid stream is then exerted against the fluid contact means and thus picked up by the force measuring means. The flow rate of the moving fluid stream can then be derived as a function of the force. The apparatus also includes a separate means, such as an ultrasonic tranducer unit, for measuring the velocity of that part of the fluid stream which flows through the first conduit section. Preferably, the transducer device is installed on the outside of the first conduit section. The density of the flowing stream can then be derived as a function of the velocity and force.

DESCRIPTION OF THE DRAWINGS

In the drawings, identical parts in each of the embodiments shown in FIGS. 1, 2, and 3, are identified with the same reference numerals, with letter suffixes being added to distinguish each of the figures.

DESCRIPTION OF THE INVENTION

Figure 1:
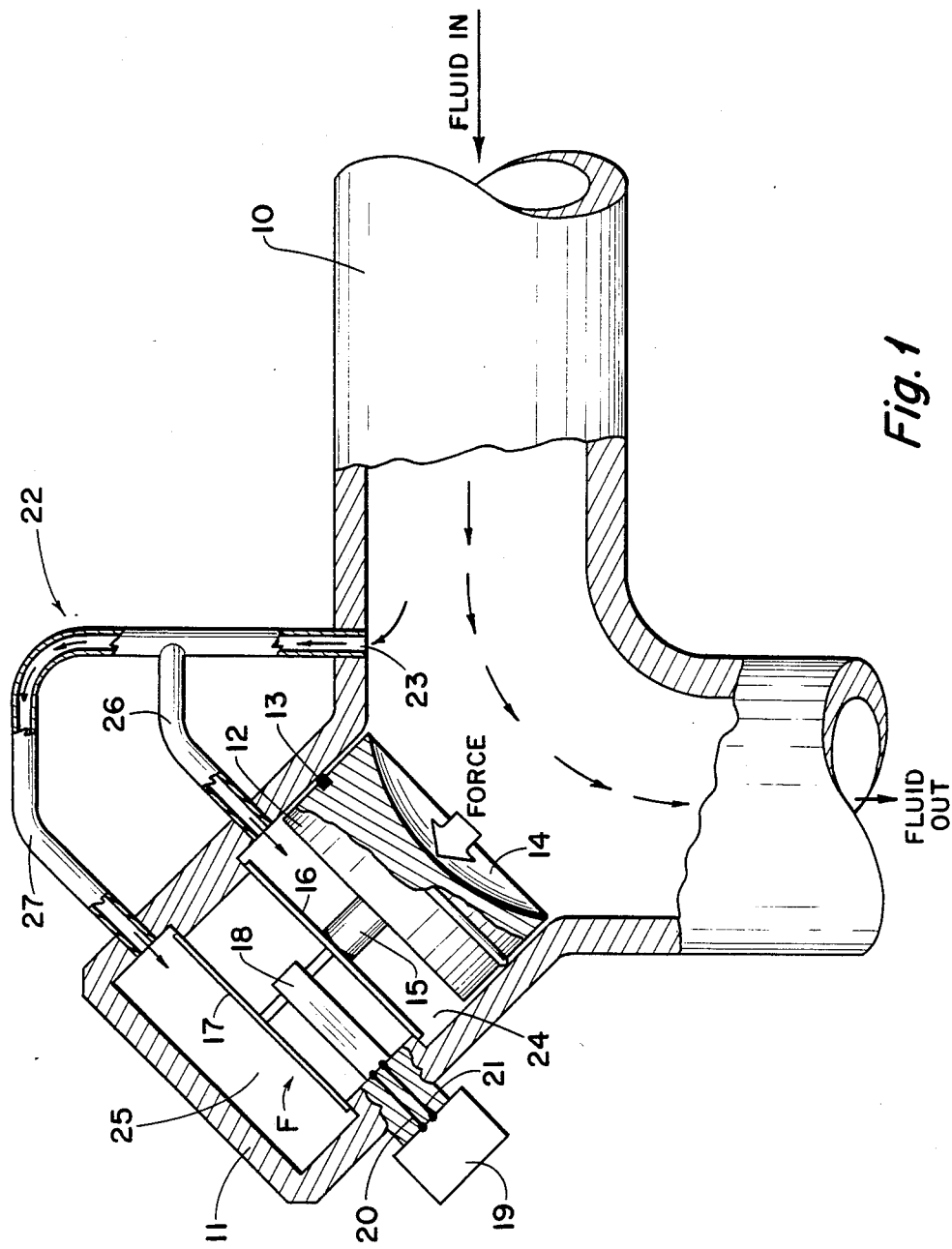
FIG. 1 is a side elevation view, partly in section and in schematic illustration, of one embodiment of a flow meter apparatus of this invention.

Referring to the drawings, the flow meter embodiment of FIG. 1 will now be described. Numeral 10 indicates a section of a conduit. In the practice of this invention, the usual procedure is to install a conduit section 10 in a pipeline, or some other form of conduit, which carries a fluid composition from a storage source to a use point, or a disposal point. The pipeline is not shown in FIG. 1, or in the other drawings which illustrate the several embodiments of this invention.

Figure 2:
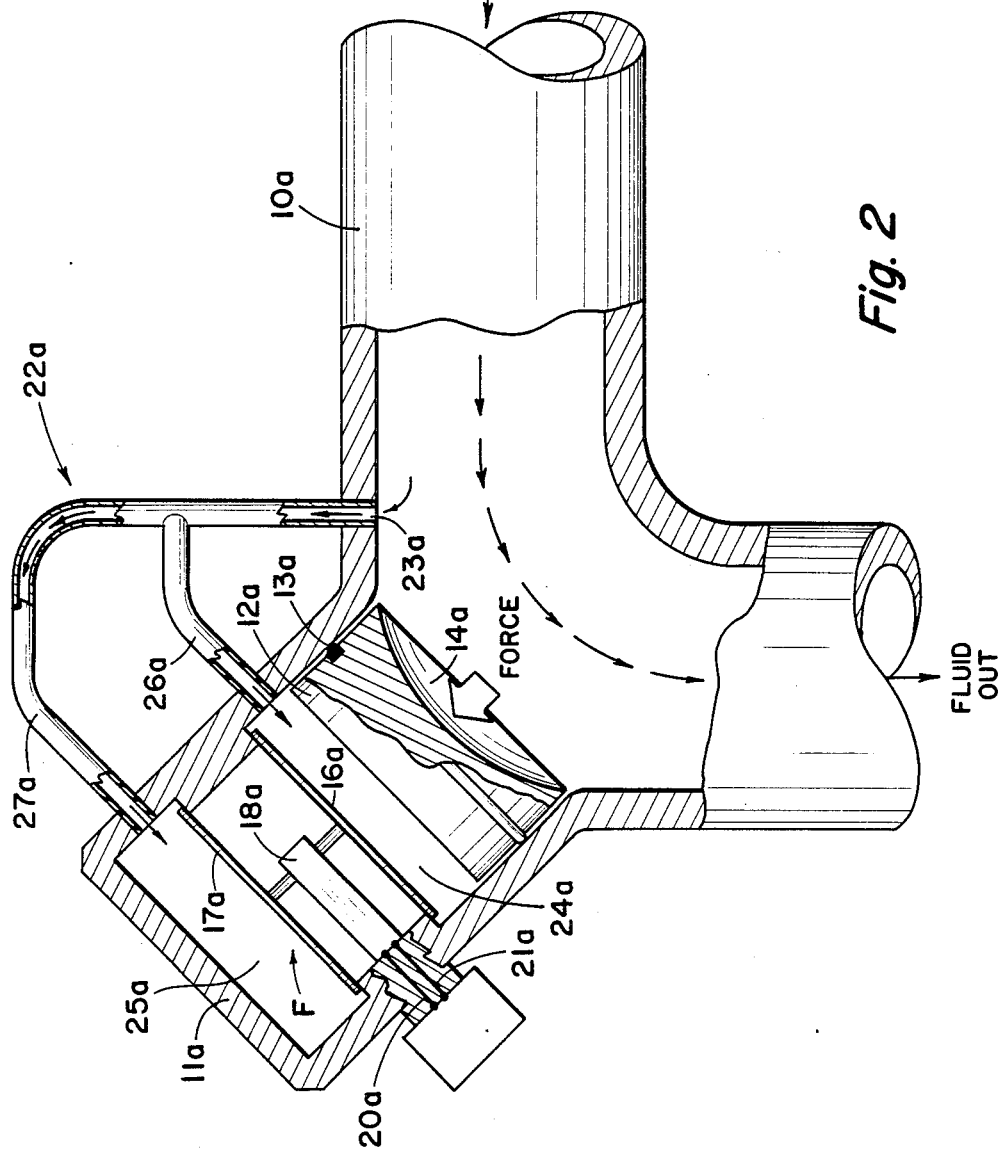
FIG. 2 is a side elevation view, partly in section and in schematic illustration, of another embodiment of a flow meter apparatus.
Figure 4:
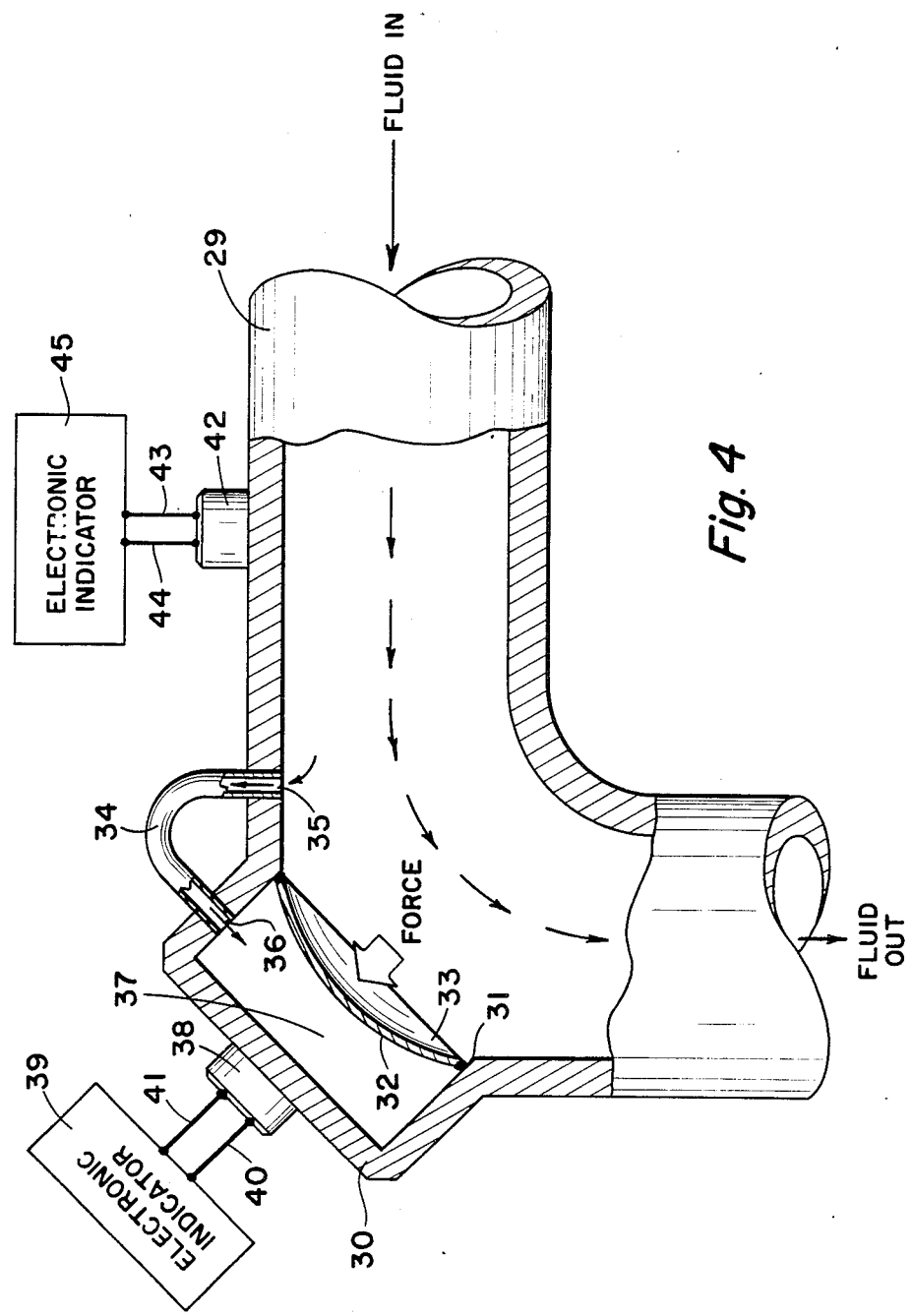
FIG. 4 is a side elevation view, partly in section and schematic illustration, of an apparatus which functions both as a flow meter and as a densitometer.

The preferred configuration for the conduit section 10 is a fitting which has a 90 degree bend therein, as shown in FIGS. 1, 2 and 4. The 90 degree fitting is used because the fluid being measured for flow rate generates its maximum force vector as it rounds the sharp turn in the fitting. However, in actual practice, it is not critical to use a 90 degree fitting in this invention. The fitting may be any angle which is desired so long as the flow meter apparatus meets the other requirements described herein. The general rule to be applied in determining the angle of this fitting, is that the force factor of the flowing stream will increase or decrease in direct proportion to the size of the angle.

The conduit section 10 includes a chamber 11, which is located at the bend in the conduit section. Inside the chamber is a piston 12, which is designed to slide up or down within the chamber. The head of piston 12 includes an O-ring seal 13. This seal prevents fluid which is flowing through the conduit section from by-passing the piston and leaking into the chamber 11. The bottom surface of the piston head defines a face 14, which is in continuous contact with fluid flowing through the conduit section 10. The preferred configuration of face 14 is a hemispherical surface, as illustrated in FIG. 1. However, this configuration is not critical to the practice of the invention. For example, the piston face may have other shapes, such as concave, or flat.

Piston 12 also includes a piston rod 15, which is secured at its bottom end to the top of the piston head. A means for measuring the force exerted by the fluid stream is also positioned inside of chamber 11. There are several conventional force measuring or displacement devices which may be used for this purpose, such as pressure force transducers, linear voltage displacement transducers, fiber optic units, and the like.

The force measuring device shown in FIG. 1, as indicated generally by the letter F, is a conventional differential pressure transducer, which has been re-calibrated to read in units of force, rather than units of pressure. The basic transducer, which is illustrated schematically in FIG. 1, includes a bottom diaphragm 16 and a top diaphragm 17. Each diaphragm is fastened into chamber 17 by resistance welding or any other suitable fastening means. The top end of the piston rod is a free end (that is, unattached) which sets flush against the underside of the diaphragm 16. Positioned between each diaphragm is a cantilever beam sensor 18, which makes contact with both diaphragms. In turn, the beam sensor is connected into an electronic connector 19, by electrical leads 20 and 21. The output from connector 19 is transmitted to a computer system (not shown).

The flow meter apparatus also includes a second conduit section, indicated generally by numeral 22. Conduit 22, which is referred to herein as a pressure equalization conduit, provides means for bringing the fluid pressure in the flow meter apparatus into equilibrium, as explained in more detail later in this description. The fluid inlet end 23 of conduit 22 opens into the larger conduit section 10 just ahead of the bend in the larger conduit. Between the topside of piston 12 and the underside of diaphragm 16 is a space, which defines a lower compartment 24 in chamber 11. The space between the topside of diaphragm 17 and the top end of chamber 11 defines an upper compartment 25.

Above the fluid inlet 23 is the short leg 26 of conduit 22. Part of the fluid from conduit 10 is directed through the short leg into compartment 24. The remaining part of the fluid which enters conduit 22 is directed into compartment 25 through the long leg 27 of conduit 22.

The flow meter device illustrated in FIG. 2 is identical to the flow meter design described above, and illustrated in FIG. 1, except for a modification in the structure of piston 12. Specifically, the piston 12, as illustrated in FIG. 2, does not include a piston rod (15).

Figure 3:
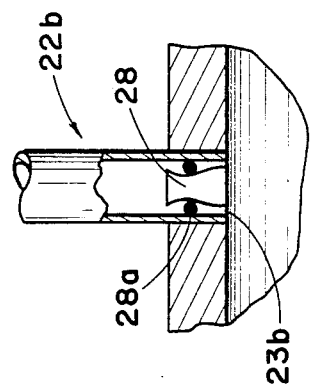
FIG. 3 is a fragmentary detail view of a separator means, which separates the fluid being measured for flow rate from fluid in the pressure equalization conduit of the apparatus shown in the several embodiments illustrated herein.

When it is desired to measure the flow rate of fluid streams which contain solids or corrosive materials, it is necessary to separate the stream flowing through the larger conduit 10 from the fluid in the pressure equalization circuit 22. This is done to prevent the corrosive materials in the stream from damaging the force measuring transducer unit and to prevent the solids from plugging off conduit 22. A separator means which may be used for this purpose is a small piston 28, as illustrated in FIG. 3. An O-ring 28a is fitted to the piston, to prevent fluid from by-passing the piston. The first step in such an operation is to fill the conduit 22 with a "clean" fluid, that is, a fluid which does not contain solids or corrosive materials, or other contaminating substances. The piston and O-ring are then inserted into the inlet end 23 of conduit 22. Thereafter, as the fluid which contains the damaging materials flows through the larger conduit 10, it pushes the piston separator up into the conduit 22 only a short distance, that is, until the fluid pressure on both sides of the piston reaches equilibrium.

The apparatus illustrated in FIG. 4 is designed to measure both the flow rate and density of a fluid stream. Although some of the parts in this view are similar to the parts shown in FIGS. 1, 2 and 3, a different set of reference numerals are used. Numeral 29 refers to the larger conduit section of this apparatus. Conduit section 29 includes a chamber 30, which is located at the bend in the conduit section. A lip 31 is defined at the point where the inner wall surface of chamber 30 is joined with the inner wall surface of conduit section 29.

A thin plate 32 is fastened into the chamber wall at the point where the lip is formed. The bottom surface of plate 32 defines a face 33 which is in continuous contact with fluid which flows through the conduit section 29. The preferred configuration for this face is a hemispherical surface, as shown; but it may have other shapes, such as concave, or flat. This apparatus includes a second conduit section 34, with a fluid inlet end 35, which opens into conduit 29. The opposite end of conduit 34 is a fluid outlet end 36, which opens into a compartment 37, which is defined in chamber 30 above plate 32.

A means for measuring force exerted by a fluid stream moving through conduit 29, is positioned on the outside of chamber 30, as indicated by numeral 38. Any of the conventional force measuring, or displacement devices, such as the devices described earlier, may be used for this purpose. The force measuring device 38, as illustrated schematically in FIG. 4, is an ultrasonic displacement transducer unit. The transducer 38 is, in turn, connected into an electronic indicater 39, by electrical leads 40 and 41. The output from indicator 39 is transmitted to a computer system (not shown).

The present apparatus also includes a means for measuring the velocity of the fluid stream, as it moves through the conduit 29. Any of the various conventional devices designed for measuring velocity of fluid streams may be used for this purpose, such as certain types of transducer units, non-intrusive flow meters and the like. The velocity measuring device 42, which is illustrated schematically in FIG. 4, is an ultrasonic Doppler transducer unit. As shown in the drawing, the transducer 42 is mounted on the conduit section 29 upstream from the bend in the conduit. The transducer device is, in turn, connected by leads 43 and 44 into an electronic indicator 45. In practice, the output from indicator 45 is transmitted to a computer system (not shown).

The present invention can be illustrated by describing certain operations in which the flow rate and density of moving fluid streams are measured. First of all, the operation of the flow meter apparatus illustrated in FIG. 1 will be described. Typically, this apparatus could be used to measure the flow rate of a fracturing slurry, which is usually a viscous liquid. Fracturing slurries are pumped into oil or gas wells, usually under high pressure, to initiate fracturing of the producing earth formation and thus enhance recovery of the oil or gas.

Referring to FIG. 1, the slurry composition is pumped into the fluid inlet end of the conduit section 10 from a pipeline (not shown) which connects into a pumper unit (not shown). After passing through the conduit section, the slurry is discharged through the fluid outlet into another pipeline (not shown) which carries it to the wellhead (not shown). As the slurry stream flows through the conduit section 10, part of the fluid pushes upwardly through the pressure equalization conduit 22, so that some of it flows into the upper compartment 25 through the long leg 27, and some of it passes through the shorter leg 26 and empties into the lower compartment 24.

When the compartments 24 and 25 are completely filled, the fluid pressure is equal throughout the system. Specifically, this means that the fluid pressure against the top diaphragm 17, the bottom diaphragm 16, and the top face of piston 12, is equal to the fluid pressure exerted against the inside wall of conduit 10 and the fluid contact face 14 of the piston. By equalizing the fluid pressure in this flow meter system, the effect of the pressure factor on the flow rate measurement is nullified or removed. This leaves the system in a condition such that the flow rate can be determined by first measuring the force generated by the moving fluid, and then calculating the flow rate as a function of the force.

During its flow through conduit 10, the gel stream generates its maximum force vector as it rounds the 90 degree bend in the conduit, as illustrated in FIG. 1. Therefore, at the bend in the conduit, the force of the fluid, as it strikes against face 14 of piston 12, causes the piston to move upwardly in chamber 11. In turn, the piston rod 15 deflects the diaphragm 16 against the arm of beam sensor 18. The pressure generated by the force on the piston is sensed by beam 18 and is picked up by strain gauges (not shown) attached to the beam. From the gauges, the force is transmitted, as an electrical signal to the electrical connector 19. From the connector, the signal is carried into a computer system (not shown), which derives the flow rate as a function of the force. Derivation of the flow rate is based on the following equation:

$$R \sim K\sqrt{F}$$

where
R = flow rate;
K = diameter of the conduit;
F = force.

The operation of the flow meter apparatus illustrated in FIG. 2 is essentially the same as the operation of the device illustrated in FIG. 1. The difference between these two systems is in the manner in which the force of the moving gel stream is transmitted to the differential pressure transducer unit F. In the device illustrated in FIG. 2, the upward movement of piston 12a, in response to the force of the moving fluid stream, compresses the fluid in compartment 24a against diaphragm 16a. The resulting force against the diaphragm is then sensed by the transducer unit F in the same manner as described for the device of FIG. 1.

The operation of the flow meter and densitometer apparatus illustrated in FIG. 4 will now be described. In this device, part of the fluid stream which flows through conduit 29 is directed into compartment 37 through the pressure equalization conduit 34, to equalize the fluid pressure in the system. As the fluid stream passes through conduit 29, it strikes the concave face of plate 32 and the force of the stream deflects the plate upwardly toward the top of chamber 30. The resulting displacement of plate 32 is sensed by the ultrasonic transducer 38. The transducer signal is then picked up by the electronic indicator 39 and carried to a computer system (not shown), which derives the flow rate values.

Along with its capability for measuring the flow rate of a moving fluid stream, this apparatus is designed for simultaneously measuring the density of the moving stream. As the fluid in conduit 10 flows past the Doppler transducer 42, the transducer measures the velocity of the moving stream. In turn, the transducer signal is picked up by the electronic indicator 45 and from there into a computer system (not shown). Using the velocity data, the computer is able to derive the density values. The density values are derived according to the following equation:

$$F \sim d \times v_2 \times a$$

where
F = force;
d = density;
$V_2$ = velocity of the fluid stream;
a = area of the conduit.

Certain details regarding materials of construction and general operating conditions will now be described. These details further describe the structure and operation of the flow meter and densitometer apparatus disclosed herein, but they are not intended as a limitation on the practice of the invention. The plate 32 may be fabricated on any rigid, but flexible, material which is compatible with the fluids which are passed through the apparatus. Examples of suitable materials for this plate include stainless steel, non-ferrous metals, plastic resins, certain rubber compounds, and the like. The thickness of the plate will depend on the actual pressure force of the fluids which are passed through this device. For example, the plate should be capable of withstanding fluid pressures up to at least 20,000 psig and flow rates up to 25,000 SCFM.

The invention claimed is:

1. A flowmeter apparatus, for measuring the flow rate of a fluid stream, the apparatus comprising:

a first conduit section having an inlet end and an outlet end, the conduit section is adapted for carrying a fluid stream from the inlet end, through the conduit section, and discharging the stream through the outlet end;

a chamber defined within the conduit section;

a piston member defined generally by a piston head and a rod secured to the head, the piston is positioned slidably within the chamber, and the piston head has a fluid contact face positioned at an angle to the fluid stream to contact a portion of the fluid stream which flows through the first conduit section;

a force measuring means which is positioned in the chamber above the piston member, so as to separate a first compartment defined between the piston and the force measuring means, from a second compartment defined within the chamber above the force measuring means, the force measuring means being in contact with the piston member;

a second conduit section which communicates with the first conduit section and with the first and second compartments, and the second conduit section is adapted for diverting a portion of the fluid stream into each of said compartments as the fluid stream flows through the first conduit section; such that the portion of the fluid stream which is diverted through the second conduit section into the first and second compartments, in the chamber, exerts a fluid pressure in said compartments which is equal to the fluid pressure of the portion of the fluid stream which flows through the first conduit section; and the fluid stream which flows through the first conduit section strikes the piston head fluid contact face and exerts a force on the piston member, said force being measured by the force measuring means; and the flow rate of said fluid stream can then be derived as a function of said force.

2. The apparatus of claim 1 in which the conduit section is defined by an elbow section having a 90 degree bend therein, the chamber is located at the 90 degree bend, and the fluid contact face of the piston head is located at the 90 degree bend.

3. The apparatus of claim 2 in which the fluid contact face of the piston head is defined by a hemispherical surface.

4. The apparatus of claim 1 which further includes a fluid separator means, the separator means being positioned in the second conduit section at the point at which the second conduit section communicates with the first conduit section.

5. The apparatus of claim 1 in which the force measuring means is a differential pressure transducer unit.

6. The apparatus of claim 5 in which the differential pressure transducer unit includes a first diaphragm member, which is adapted for contacting that portion of the fluid stream diverted into the first compartment, a second diaphragm member which is adapted for contacting that portion of the fluid stream diverted into the second compartment, and the piston rod has a free end which is in contact with the first diaphragm member.

7. The apparatus of claim 1 in which the second conduit section and the first and second compartments of the chamber section are filled with a viscous fluid.

* * * * *